United States Patent
Segura Puchades

(10) Patent No.: US 7,821,558 B2
(45) Date of Patent: Oct. 26, 2010

(54) IMAGE SENSOR WITH CIRCUITRY FOR DETECTING EACH PIXEL RECEIVING A GIVEN LIGHT INTENSITY AND PROVIDING ADDRESSES THEREOF

(75) Inventor: Josep Segura Puchades, Fontaine (FR)

(73) Assignee: STMicroelectronics S.A., Montrouge (FR)

( * ) Notice: Subject to any disclaimer, the term of this patent is extended or adjusted under 35 U.S.C. 154(b) by 943 days.

(21) Appl. No.: 11/599,176

(22) Filed: Nov. 14, 2006

(65) Prior Publication Data
US 2007/0109434 A1    May 17, 2007

(30) Foreign Application Priority Data
Nov. 15, 2005    (FR) .................................... 05 53464

(51) Int. Cl.
*H04N 3/14*    (2006.01)
*H04N 5/335*    (2006.01)
(52) U.S. Cl. ........................ 348/308; 348/294
(58) Field of Classification Search ................ 348/294, 348/297, 222.1, 302, 308; 250/208.1
See application file for complete search history.

(56) References Cited

U.S. PATENT DOCUMENTS

| 5,404,556 | A | 4/1995 | Mahowald et al. |
| 6,253,161 | B1 | 6/2001 | Arias-Estrada |
| 6,271,785 | B1 | 8/2001 | Martin et al. |
| 6,660,989 | B2 * | 12/2003 | Guo et al. ................ 250/208.1 |
| 6,665,010 | B1 * | 12/2003 | Morris et al. ............... 348/297 |
| 7,512,861 | B2 * | 3/2009 | Brajovic ....................... 706/20 |
| 2003/0107666 | A1 | 6/2003 | Harton et al. |

FOREIGN PATENT DOCUMENTS

WO    WO 2004/038803 A1    11/2005

OTHER PUBLICATIONS

French Search Report from corresponding French Application No. 0553464, filed Nov. 15, 2005.

* cited by examiner

*Primary Examiner*—Nelson D Hernández Hernández
(74) *Attorney, Agent, or Firm*—Lisa K. Jorgenson; William R. McClellan; Wolf, Greenfield & Sacks, P.C.

(57) ABSTRACT

An image sensor including an assembly of pixels each having a photodetector, and having circuitry for detecting, at a given time, pixels receiving a light intensity value substantially equal to a given value and coding circuitry providing an address for each of said pixels.

14 Claims, 8 Drawing Sheets

IMAGE SENSOR WITH CIRCUITRY FOR DETECTING EACH PIXEL RECEIVING A GIVEN LIGHT INTENSITY AND PROVIDING ADDRESSES THEREOF

BACKGROUND OF THE INVENTION

1. Field of the Invention

The present invention relates to an image sensor, and more specifically to a camera-type sensor capable of providing a video signal, that is, the equivalent of an image sequence with a 25- or 30-Hz frequency corresponding to standard video signal frequencies.

2. Discussion of the Related Art

An example of an image sensor is described in U.S. Pat. No. 6,271,785. As shown in FIG. 1 of this patent, the image sensor comprises an array of pixels arranged in rows and columns. Each pixel comprises a photodetector connected to an input of a comparator and a switch placed between the comparator output and a column line, the switch being controlled by a row line (ROW1, ROW2 . . . ). The output of a digital-to-analog converter (D/A) is connected to the second input of the comparator of each pixel. The D/A converter is controlled by a counter. Each column line is connected to a register.

Conventionally, the rows are read one after the other. On reading a row, a voltage ramp is generated by the D/A converter. For each pixel in the considered row, the output of its comparator switches when the ramp voltage becomes equal to the voltage provided by its photodetector. When the comparator of a pixel of a given column switches, the register connected to this column stores the digital value transmitted by the counter.

A disadvantage of the previously-described image sensor is that the time necessary to read each line is relatively long. The number of sensor lines must thus be limited in the case where images are desired to be provided with a video frequency.

Further, this sensor is not provided to take snapshots. Referring to FIG. 2, this would require simultaneously performing for each pixel a charge transfer from the photodiode to the comparator input, through transistor M2. The pixels would then be read row by row according to the above-mentioned method. Since the voltage "stored" on the comparator input tends to "deteriorate" relatively fast, the values read for the last read pixels would be tainted with error, given the long read time necessary to scan all of the pixels.

SUMMARY OF THE INVENTION

An object of the present invention is to provide an image sensor comprising a large-size array that can be read with a frequency at least equal to 25 Hz.

Another object of the present invention is to provide such an image sensor which enables taking snapshots with no degradation in the quality of the measured light signals.

Another object of the present invention is to provide an image sensor which enables measuring, for each pixel, a very wide range of light intensity values.

To achieve all or part of these objects, the present invention provides an image sensor comprising an assembly of pixels each comprising a photodetector, the image sensor comprising means for detecting, at a given time, pixels receiving a light intensity value substantially equal to a given value and coding means providing an address for each of said pixels.

According to an embodiment of the above-mentioned sensor, in an image capture, the detection means are controlled to successively detect pixels groups, the pixels of a same group receiving substantially identical light intensities.

According to an embodiment of the above-mentioned sensor, each pixel comprises a controllable device which, when activated, warns the detection means when the light intensity value recorded by the pixel is either smaller than, or greater than, or substantially equal to a given light intensity value, and comprises a locking device capable of deactivating the controllable device when the detection means have detected a warning transmitted by the pixel.

According to an embodiment of the above-mentioned sensor, the pixels form a pixel array arranged in rows and columns, the pixels of a same row being connected to a vertical request line and a vertical acknowledgement line, and the pixels of a same column being connected to a horizontal request line and a horizontal acknowledgement line, a vertical scan circuit being connected to the vertical request and acknowledgement lines and a horizontal scan circuit being connected to the horizontal request and acknowledgement lines, where the request lines can be activated by the pixels and the acknowledgement lines can be activated by the scan circuits after detection of activated request lines.

According to an embodiment of the above-mentioned sensor, the sensor comprises a generator of a reference voltage having, in pixel detection operations, the shape of a stepped voltage ramp, each pixel comprising: a switch controllable by a sampling signal and placed between the photodetector and an internal node; a comparator between the voltage of the internal node and the reference voltage; a first triggering device capable of activating a vertical request line when the comparator output is at a first predefined "0" or "1" logic level; an AND-type gate receiving the vertical request and acknowledgement lines; a second triggering device capable of activating a horizontal request line when the output of the AND-type gate is active; and a locking device forcing the output of the comparator to a second predefined level, different from the first predefined level, when the vertical and horizontal acknowledgement lines are activated, an initialization signal enabling unlocking the comparator output.

According to an embodiment of the above-mentioned sensor, the vertical scan circuit comprises means for, at each stage of the reference voltage, detecting one by one the activated rows which have a vertical request line activated by one or several pixels of the considered row, and means for activating the vertical acknowledgement line of each activated row, and the horizontal scan circuit comprises means for, for each activated row, detecting one by one the activated columns which have a horizontal request line activated by a pixel of the considered column, and means for activating the horizontal acknowledgement line of each activated column.

According to an embodiment of the above-mentioned sensor, said coding means comprise first and second coding circuits respectively connected to the vertical and horizontal scan circuits, the first coding circuit providing a first address corresponding to a row number and the second coding circuit providing a second address corresponding to a column number, the gathering of the first and second addresses forming said address associated with each pixel.

According to an embodiment of the above-mentioned sensor, said generator is a digital-to-analog converter controlled by a counter, the voltage ramp provided by the generator on detection operations being performed by stages, each corresponding to an increment or a decrement of the counter, a conversion device connected to the counter providing digital values corresponding to a light intensity level.

According to an embodiment of the above-mentioned sensor, the sensor further comprises a masking device capable of controlling the pixel locking devices to deactivate the controllable devices of a pixel assembly.

The present invention further provides a method of capture of an image by an image sensor comprising an array of pixels arranged in rows and columns, each pixel comprising a photodetector, the method comprising the steps of: a) integrating in each photodetector the photons received by each pixel, for a predefined integration time period; b) detecting the pixels receiving a given light intensity value; c) providing, for each of said pixels, an address indicating the row and the column to which the considered pixel belongs.

According to an embodiment of the above-mentioned method, steps b) and c) are repeated for different light intensity values ranging within a predefined range of light intensity values.

The present invention further provides a method for capturing an image, comprising the step of repeating n times the above-mentioned method for different integration time periods T1 to Tn, range Pi of light intensity values detected in the i-th repetition corresponding to values which are all the higher as integration time period Ti is short, with i ranging between 1 and n.

According to an embodiment of the above-mentioned method, the photons are integrated during successive integration time periods T1 to Tn, the photodetectors being reset prior to each integration phase.

According to an embodiment of the above-mentioned method, time periods T1 to Tn are increasingly long, ranges P1 to Pn corresponding to lower and lower ranges of values.

Further, the above-mentioned image capture method may be implemented by an image sensor such as those described hereabove, and the method comprises the steps of: activating the sampling signal to perform a charge transfer from the photodiode to the internal node of each pixel, then deactivating the sampling signal; controlling a stepped ramp on the reference voltage and, for each stage, detecting a group of pixels by performing the steps of: a) detecting the activation of a vertical request line of a first activated row and activating the vertical acknowledgement line of this first activated row; b) providing a first address corresponding to the first activated row; c) detecting the activation of a horizontal request line of a first activated column and activating the horizontal acknowledgement line of this first activated column; d) providing a second address corresponding to the first activated column, and providing a general address resuming the first and second addresses; e) detecting, if present, a second activated column and activating its horizontal acknowledgement signal; f) providing a second address corresponding to the second activated column, and providing a general address; g) repeating, if need be, operations e) and f) for other activated columns; and h) performing, if need be, a new detection of a second activated row and resuming operations b) to g) for this second activated row, and so on until the last activated row.

According to an embodiment of the above-mentioned method, with each of said pixels detected as having a given light intensity value is associated a digital value corresponding to the light intensity value received by the considered pixel, each digital value being coded over n bits distributed in n1 most significant bits and n2 least significant bits, number k of repetitions of the detection operations being equal to $2^{n1}$, and the values of the n1 most significant bits of the pixel groups detected in the n repetitions are different, the value of the n1 most significant bits of a pixel group being all the higher as the range of light intensity values associated with this group is high, the n2 least significant bits of the digital values of a pixel having a value which is all the higher as the light intensity level received by this pixel corresponds to a high level of the range of light intensity values associated with the group of this pixel.

The foregoing and other objects, features, and advantages of the present invention will be discussed in detail in the following non-limiting description of specific embodiments in connection with the accompanying drawings.

DETAILED DESCRIPTION

Figure 1:
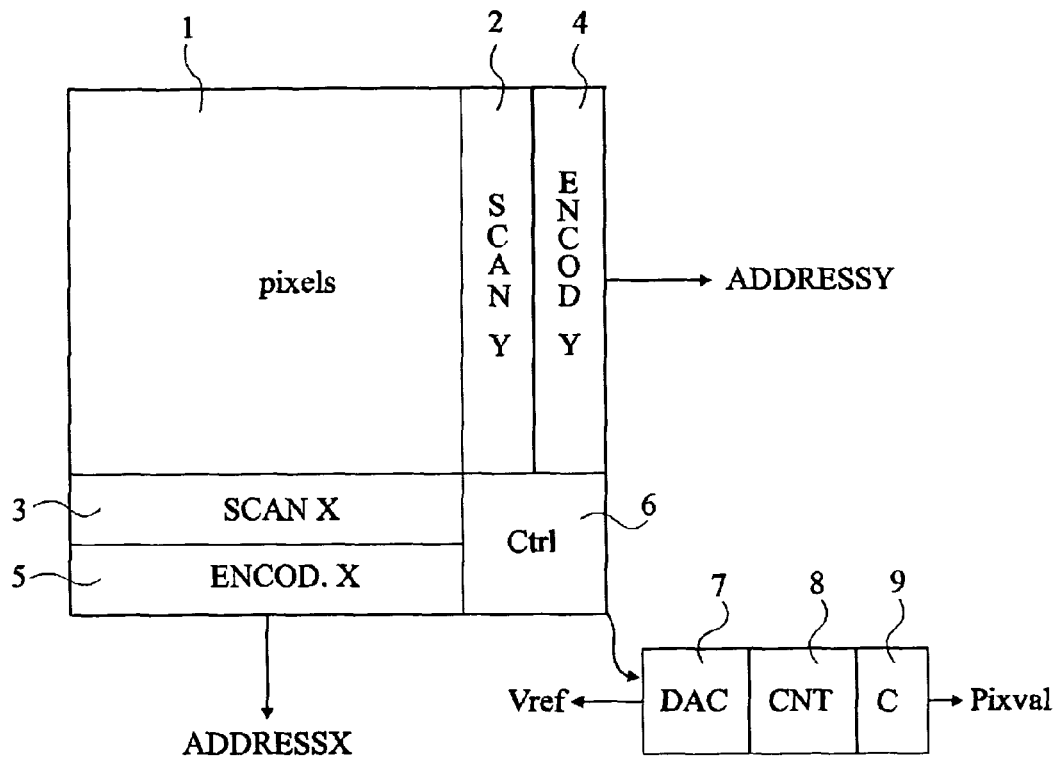
FIG. 1 is a diagram of a sensor according to an embodiment of the present invention.

For clarity, the same elements have been designated with the same reference numerals in the different drawings.

In a first part, an image sensor according to the present invention and an image capture method according to the present invention will be described.

In a second part, a "wide dynamic range" image capture method enabling measurement of a very wide range of light intensity values will be described.

In a third part, a possible use of an example of a sensor according to the present invention enabling masking of the pixels of an image sensor according to the present invention will be described.

1. Image Sensor 1.1 General Considerations

An image sensor according to the present invention comprises a set of pixels. Each pixel comprises a photodetector such as a photodiode. The image sensor comprises detection means enabling, at a given time, detecting which pixels receive, in other words, record, a given light intensity value. The detection means are associated with coding means capable of indicating the addresses of the detected pixels as recording a given light intensity value.

The capture of an image according to the method of the present invention comprises an integration phase followed by a detection phase. During the integration phase, the photodetectors "integrate" the light photons received by the sensor. In the case of a photodiode, the receiving of photons translates as a charge storage across the photodiode. Thus, the voltage across a photodiode decreases as photons are received for the entire integration time period. During the detection phase, the pixels which sample a given light intensity value at the end of the integration period are detected, and an address is provided for each of these pixels.

The detection phase may be formed either of a single detection cycle, when it is for example desired to identify which pixels record a given intensity value, for example, maximum or minimum, or of several detection cycles enabling successive detection of the pixel groups recording different light intensity values, which amounts to identifying the pixels recording light intensity values belonging to a predefined range of values.

FIG. 1 is a diagram of an image sensor according to the present invention. The image sensor comprises an array 1 of pixels arranged in rows and columns. The pixel rows, shown horizontally, are connected to a vertical scan circuit SCANY 2. The pixel columns, shown vertically, are connected to a horizontal scan circuit SCANX 3. Vertical and horizontal scan circuits 2 and 3 are respectively connected to a vertical coding circuit ENCODY 4 and to a horizontal coding circuit ENCODX 5. Vertical and horizontal coding circuits 4 and 5 respectively provide address signals ADDRESSY and ADDRESSX. Scan circuits 2, 3 and coding circuits 4, 5 are connected to a control circuit Ctrl 6.

Vertical and horizontal scan circuits 2 and 3 respectively enable identifying which rows and columns comprise pixels recording a given light intensity value. Vertical and horizontal coding circuits 4, 5 each enable defining a portion of the address of a considered pixel. Vertical coding circuit 4 indicates in digital form, by means of address signal ADDRESSY, a binary number corresponding to the number of a row, that to which the given pixel belongs. Horizontal coding circuit 5 indicates in digital form, by means of address signal ADDRESSX, a binary number corresponding to the number of a column, that to which the considered pixel belongs.

In an embodiment of the present invention, a digital-to-analog converter 7 provides a reference voltage Vref, corresponding to a reference light intensity value for the detection of the array pixels in a detection phase. Digital-to-analog converter 7 is controlled by a counter CNT 8. Counter 8 is connected to a conversion device 9 which provides a digital value Pixval corresponding to a light intensity value.

Figure 2:
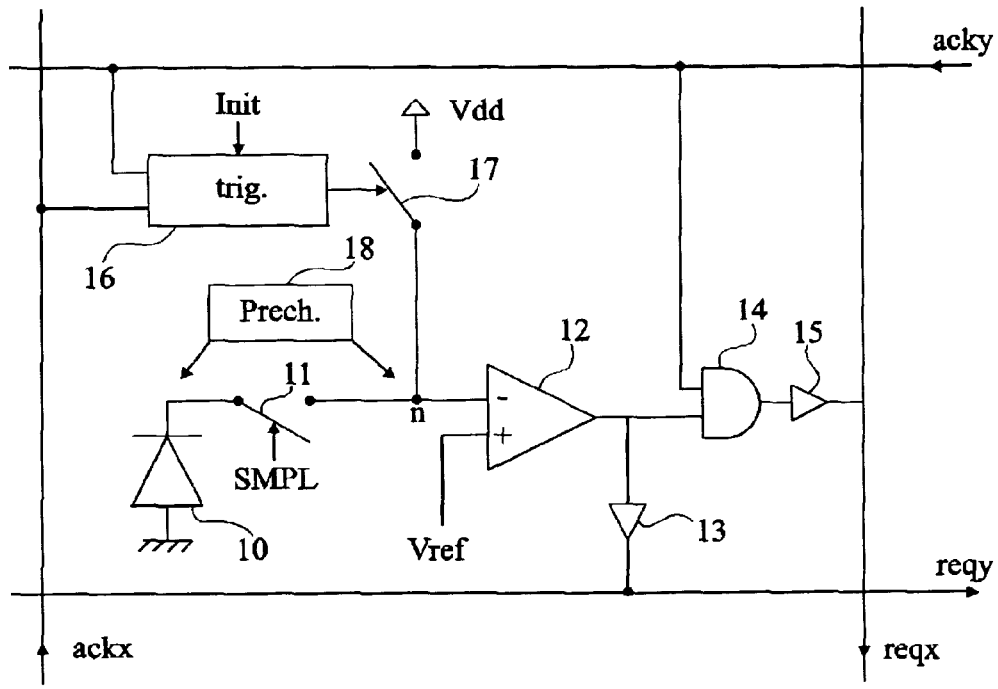
FIG. 2 is a diagram of an example of a pixel of an image sensor according to the present invention.

An operating mode of the various elements of the image sensor shown in FIG. 1 is described in further detail hereafter in relation with a pixel example shown in FIG. 2.

1.2 Structure of a Pixel and Detailed Operation of the Sensor

FIG. 2 is a diagram of an example of a pixel of the image sensor shown in FIG. 1. The pixel comprises a photodiode 10 having its anode connected to ground. A switch 11 is placed between the cathode of photodiode 10 and an internal node n. The pixel further comprises a comparator 12 receiving, on a positive terminal, reference voltage Vref and, on a negative terminal, a voltage Vn of internal node n. The output of comparator 12 is connected to a triggering device 13 which enables activating a vertical request line reqy. Further, the output of comparator 12 is connected to an input of an AND-type gate 14 receiving on its other input a vertical acknowledgement line acky. The output of gate 14 is connected to a triggering device 15 which enables activating a horizontal request line reqx. The pixel further comprises a locking device 16 which receives as an input a horizontal acknowledgement line ackx and vertical acknowledgement line acky, as well as an initialization signal Init. The locking device controls a switch 17 placed between internal node n and a supply voltage Vdd. Further, a precharge device 18 enables precharging the cathode of photodiode 10 and internal node n.

The pixels from a same row are connected to a same vertical request line reqy and to a same vertical acknowledgement line acky. The pixels from a same column are connected to a same horizontal request line reqx and to a same horizontal acknowledgement line ackx. Vertical request and acknowledgement lines reqy and acky are connected to vertical scan circuit 2. Horizontal request and acknowledgement lines reqx and ackx are connected to horizontal scan circuit 3.

Figure 3:
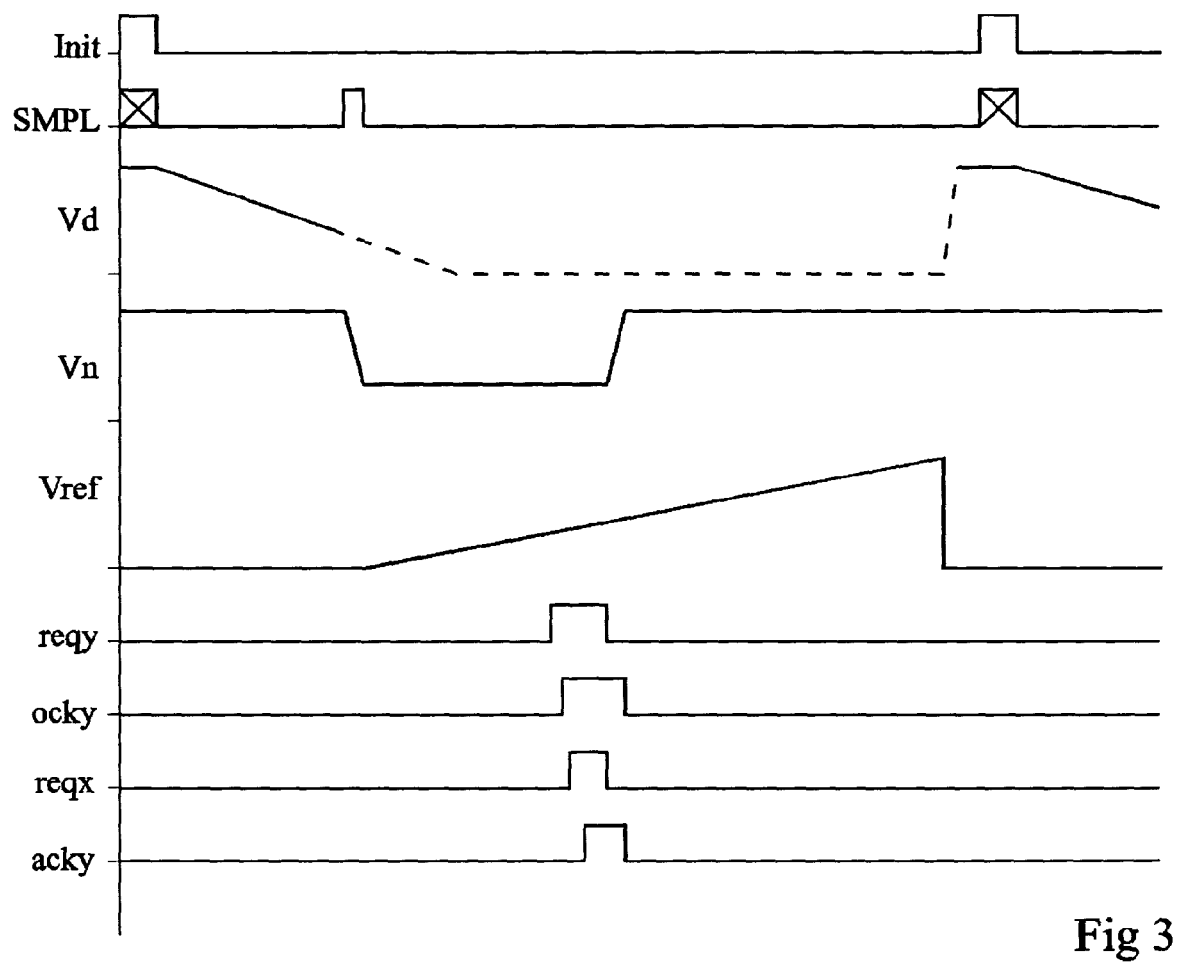
FIG. 3 is a timing diagram illustrating the signals of an image sensor comprising pixels such as that shown in FIG. 2.

FIG. 3 is a timing diagram illustrating the shape of the internal signals of a pixel and the signals received by the latter, when an image capture is performed.

In the integration phase, the cathode of photodiode 10 is initially precharged to a positive voltage. Voltage Vd across the photodiode is initially equal to supply voltage Vdd in this example. Then, for a predefined integration time period, switch 11 is off and the precharge device is inactive on the photodiode side. Voltage Vd across the photodiode decreases slower or faster according to whether the number of received photons is high or not.

During this integration phase, precharge device 18 imposes on node n a voltage equal in this example to supply voltage Vdd. Reference voltage Vref is zero. Triggering devices 13 and 15 are inactive and, accordingly, request lines reqx, reqy are inactive at logic level "0". Acknowledgement lines acky and ackx, controlled by horizontal and vertical scan circuits 2 and 3, are inactive at logic level "0".

At the end of the integration period, precharge device 18 stops imposing a voltage on internal node n and sampling signal SMPL is activated to turn on switch 11. Switch 17 is off. The charges stored in the cathode of photodiode 10 are then transferred onto internal node n. Voltage Vn of internal node n decreases and becomes equal to voltage Vd across photodiode 10. Sampling signal SMPL is then deactivated and switch 11 turns off.

A detection phase is then started. Reference voltage Vref is initially zero and progressively increases in the shape of a ramp described in further detail hereafter. The output of comparator 12 is initially at logic level "0" and triggering devices 13 and 15 are inactive. When reference voltage Vref reaches a value equal to that of voltage Vn of the internal node, the output of comparator 12 switches to logic level "1". Triggering device 13 then activates request line reqy, which switches to level 1. After detection of the activation of request line reqy, vertical scan circuit 2 activates vertical acknowledgement line acky. The two inputs of AND gate 14 then being at level 1, the output of AND gate 14 switches to level "1" and triggering device 15 activates request line reqx, which switches to level 1. After detection of the activation of request line reqx, horizontal scan circuit 3 activates acknowledgement signal ackx. Both lines ackx and acky being then activated, locking device 16 controls the turning on of switch 17. Voltage Vn at node n becomes equal to supply voltage Vdd. The output of comparator 12 switches back down to logic level 0, the same occurring for the output of AND gate 14. Triggering devices 13 and 15 are then inactive. Deactivation devices, not shown, enable setting request lines reqx and reqy back to level 0. Vertical horizontal scan circuits 2 and 3 deactivate acknowledgement lines ackx and acky.

Figure 4:
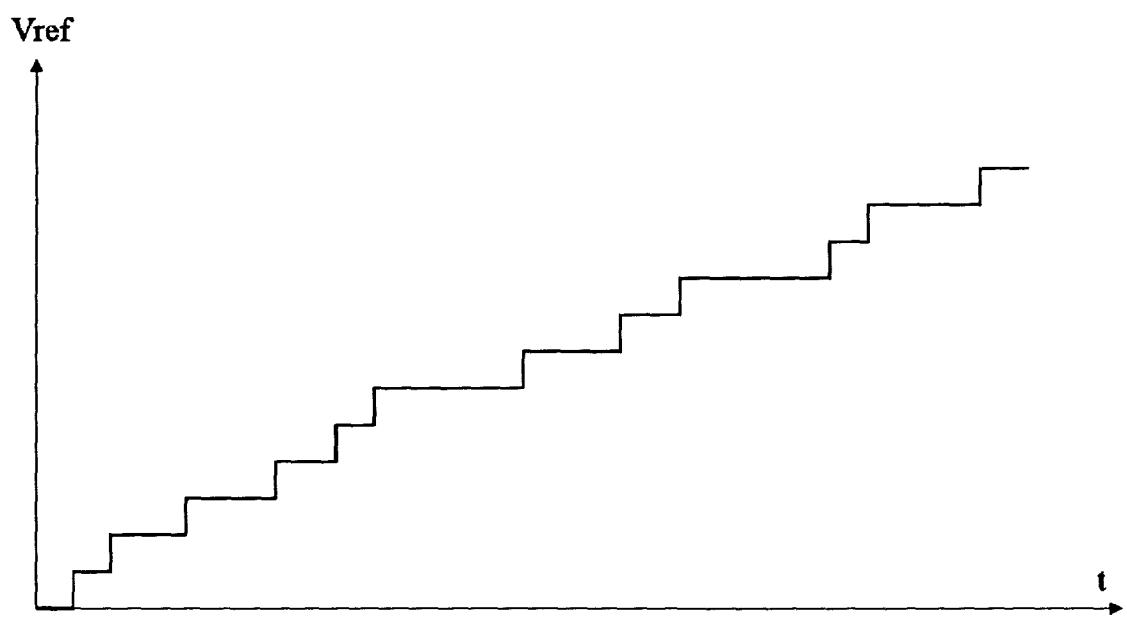
FIG. 4 is a timing diagram illustrating a reference voltage used by an image sensor according to an embodiment of the present invention.

FIG. 4 is a diagram illustrating in further detail the shape of reference voltage Vref in a detection phase. The reference voltage has the general shape of an ascending ramp in this example. The increase in reference voltage Vref is performed in successive stages.

In the first stage, the pixels with the stronger signal, having a substantially zero voltage Vd across their photodiode, will be those to "manifest". The pixels of this first group of pixels with a stronger signal are then detected one after the other according to a method which will be described in further detail hereafter. Once this first group of pixels has been detected, voltage Vref increases up to a second stage. The pixels with a slightly lower signal manifest and are detected one after the other. Once this second group of pixels has been detected, voltage Vref increases, and so on.

Once a pixel has manifested, on a given stage of reference voltage Vref, the locking device 16 of this pixel locks the output of comparator 12, at level 0 in this example, so that triggering devices 13 and 15 of this pixel are not active for the next reference voltage stages.

At the end of a detection phase, or more exactly prior to a new detection phase, the locking device 16 of each pixel are "unlocked" so that comparators 12 can switch again. For this purpose, initialization signal Init is activated.

Further, the pixels manifesting on a same stage of voltage Vref are assigned a same digital value Pixval, provided by converter 9 of the sensor shown in FIG. 1. Since the number of stages of the reference voltage is not infinite, a finite number of digital values Pixval can be assigned. These values belong to a range of values such as [0; $2^n$], where n is an integer. Each digital value Pixval corresponds to a given light intensity value. The higher digital value Pixval, the higher the corresponding light intensity value. Thus, to each range of digital values Pixval corresponds a given range of light intensity values, as described in further detail in relation with FIG. 11.

In the case where the voltage ramp followed by the reference voltage crosses the entire voltage range 0 V-Vdd, all the array pixels manifest in the detection phase. All the pixels which receive an amount of photons greater than or equal to a maximum threshold quantity corresponding to the quantity necessary to have the voltage of their photodiode cathode drop to 0 V are assigned a same digital value Pixval, that is, the maximum digital value in the range of digital values. Similarly, all the pixels which are detected last, when voltage Vref is equal to voltage Vdd, are assigned the minimum digital value in the range of digital values, however small the amount of photons received by these pixels may be.

It should further be noted that in the previously-described pixel example, the pixel switch control signals are active, in other words, control the switch turning-on, when they are at logic level "1". However, one or several of the pixel switches could be on when its control signal is at level "0". The switches for example are N-type or P-type MOS transistors which turn on when the control signal applied on their gate respectively is at logic level 1 or 0. For simplicity, the switches are shown in the same way, whether they turn on with a level 1 or 0.

1.3 Scan and Pixel Detection Circuits

Figure 5:
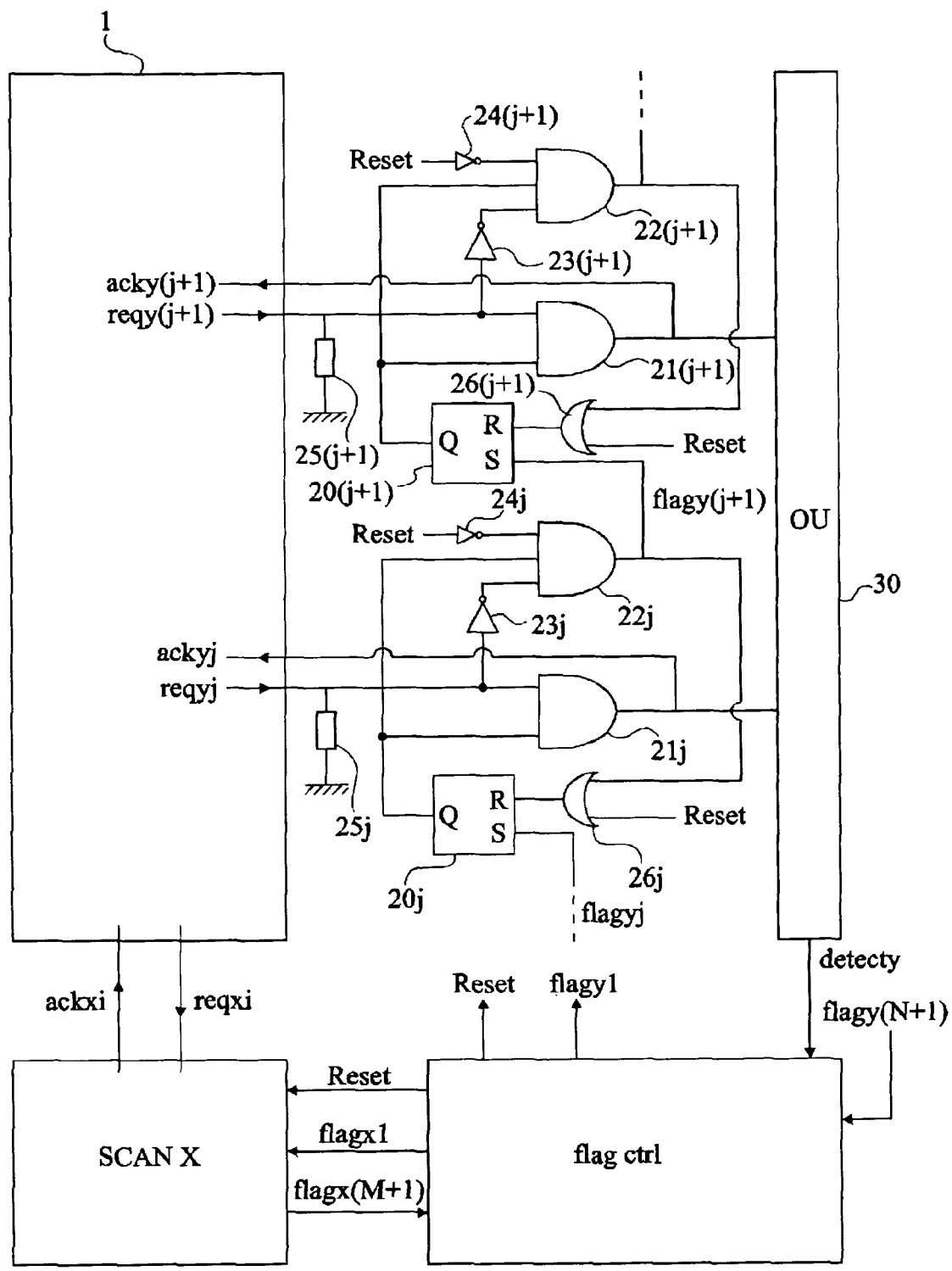
FIG. 5 is a detailed diagram of an image sensor scan circuit comprising pixels such as that shown in FIG. 2.

FIG. 5 is a diagram illustrating in further detail the structure of scan circuits 2 and 3 of the previously-described image sensor. Vertical circuit SCANY 2 is formed of an assembly of N elementary blocks. The j-th elementary block is connected to vertical request line reqyj and to vertical acknowledgement line ackyj of the j-th row in the pixel array, with j ranging between 1 and N. The j-th elementary block comprises an RS flip-flop 20j having its Q output switching to level 0 when its R reset input is at 1 and switching to level 1 when its S set input is at 1, R and S inputs at 0 causing no change at the Q output. RS flip-flip 20j receives a flag signal flagyj from elementary block j−1 on its S output. The Q output of RS flip-flop 20j is connected to an input of an AND gate 21j and to an input of an AND gate 22j. AND gate 21j receives on its other input request line reqyj. An inverter 23j is placed between request line reqyj and an input of AND gate 22j. The third input of AND gate 22j is connected to the output of an inverter 24j which receives a signal Reset. The output of AND gate 21j is connected to acknowledgement line acky. The output of AND gate 22j provides a flag signal flagy(j+1) onto the S input of RS flip-flop 20(j+1) of the next elementary block j+1. The output of AND gate 22j is further connected to an input of an OR gate 26j. OR gate 26j receives signal Reset on its other input. The output of OR gate 26j is connected to the R input of RS flip-flop 20j. A deactivation device 25j, such as a resistor, is placed between request line reqyj and the ground.

A "global" OR gate 30 receives as inputs the outputs of AND gates 21 of the set of elementary blocks. The output of OR gate 30 provides a signal detecty to control circuit 6 of the image sensor. Further, the last elementary block provides a flag signal flagy(N+1) to control circuit 6. Control circuit 6 provides signal Reset used in the set of elementary blocks, as well as a signal flagy1, to the input of RS flip-flop 20(1) of the first elementary block of vertical scan circuit SCANY 2.

Horizontal scan circuit SCANX 3 is formed of an assembly of M elementary blocks identical to those of previously-described vertical scan circuit SCANY 2. Control circuit 6 provides signal Reset and a flag signal flagx1 to the first elementary block of horizontal scan circuit 3. The last elementary block of horizontal scan circuit 3 provides a flag signal flagx(M+1) to control circuit 6. Further, horizontal scan circuit 3 comprises an OR gate, equivalent to gate 30, which provides a signal detectx.

The operation of scan circuits 2 and 3 in a phase of detection of the pixels of the previously-described image sensor is the following.

Prior to the pixel detection, signal Reset is activated, at logic level 1 in this example. The Q outputs of RS flip-flops 20 are then set to logic level 0. Lines reqy, acky, reqx, and ackx are inactive, at logic level 0. Flag signals flagy1 to flagy(N+1) and flagx1 to flagx(M+1) are at "0".

At the beginning of a detection phase, signal Reset is deactivated. On a given stage of reference voltage Vref, one or several pixels of the array can manifest and activate one or several vertical request lines reqy, for example, lines reqy1 and reqy6 of the first and sixth array rows. The active request lines reqy are then detected one after the other by vertical scan circuit 2.

For this purpose, control circuit 6 activates flag signal flagy1, which switches the Q output of RS flip-flop 20(1) of the first block of vertical scan circuit 2 to "1". Request line reqy1 being activated, the output of AND gate 21(1) switches to "1", which activates acknowledgement line acky1. Signal detecty at the output of OR gate 30 switches to 1. Control circuit Ctrl 6 then activates flag signal flagx1 to trigger a horizontal scanning in scan circuit SCANX 3, to detect, according to a method which will be specified hereafter, which pixels of the first row have manifested first. When the horizontal scanning is over, no pixel of the first row activates request line reqy1 any more and said line is deactivated to level 0 by deactivation device 25(1). The output of AND gate 21j switches and acknowledgement line acky1 is deactivated, to level 0.

Once the first array row has been scanned, the flag signal "propagates" through the elementary blocks of the vertical scan circuit to the next elementary block connected to an active request line reqy, line reqy6 in our example. In practice, at the time when request line reqy1 becomes inactive, the output of AND gate 22(1) switches to level 1 and flag signal flagy2 is activated. The Q output of RS flip-flop 20(1) then switches to "0". The output of RS flip-flop 20(2) switches to "1". Line reqy2 being inactive in our example, the output of AND gate 22(2) switches to level 1 and flag signal flagy3 is activated. Similarly, flag signals flagy4, flagy5, and flagy6 are successively activated. Line reqy6 being activated, the output of AND gate 22(6) does not switch to "1" and the propagation of the flag signal is momentarily interrupted. The output of AND gate 21(6) and signal detecty at the output of OR gate 30 switch to 1. Circuit Ctrl 6 then orders a new horizontal scanning by circuit SCANX 3.

Once this horizontal scanning is over, the propagation of the vertical scan signal resumes until the last block activates flag signal flagy(N+1).

A horizontal scanning by circuit SCANX 3 is performed according to a method similar to that previously described for vertical scan circuit SCANY 2. A flag signal propagates through the elementary blocks of circuit SCANX 3. The propagation of the flag signal is interrupted each time a request line reqx is activated, for example, line reqx2. The corresponding acknowledgement line, line ackx2 in this example, is then activated. The pixel located on the second column and the row undergoing the analysis, for example, the second or the sixth row in our example, is then "locked". Triggering devices 13 and 15 of this pixel become inactive and request line reqx2 becomes inactive by the action of a deactivation device connected to this request line. The horizontal scanning ends when flag signal flagx(M+1) is activated.

Once flag signal flagy(N+1) is activated, all the pixels recording a given intensity level have been detected. The intensity level of the detected pixels is defined by the value of the current stage of reference voltage Vref. Signal Reset can then be activated to, if necessary, set back to 0 the Q output of each of the RS flip-flops of scan circuits 2 and 3. Reference voltage Vref is incremented. At the next stage of reference voltage Vref, the previously-described scan operations are repeated and so on until the next stage of the reference voltage.

Further, on each stop of vertical flag signal flagy at the level of an elementary block of vertical scan circuit SCANY 2, in other words, each time the output of an AND gate 21 switches to 1 and a horizontal scanning is performed, coding circuit ENCODY 4 provides a new address signal ADDRESSY corresponding to the row of the newly-analyzed array. Similarly, on each stop of horizontal flag signal flagx at the level of an elementary block of horizontal scan circuit SCANX 3, coding circuit ENCODX 5 provides a new address signal ADDRESSX corresponding to the analyzed array column.

Thus, during the scan operations, the image sensor provides address/digital value Pixval couples corresponding to each of the detected pixels. These couples may be provided with a very high rate, for example, equal to 50 MHz.

1.4 Alternative Embodiments of Pixels

Various embodiments of the pixel shown in FIG. 2 will be described hereafter.

Figure 6:
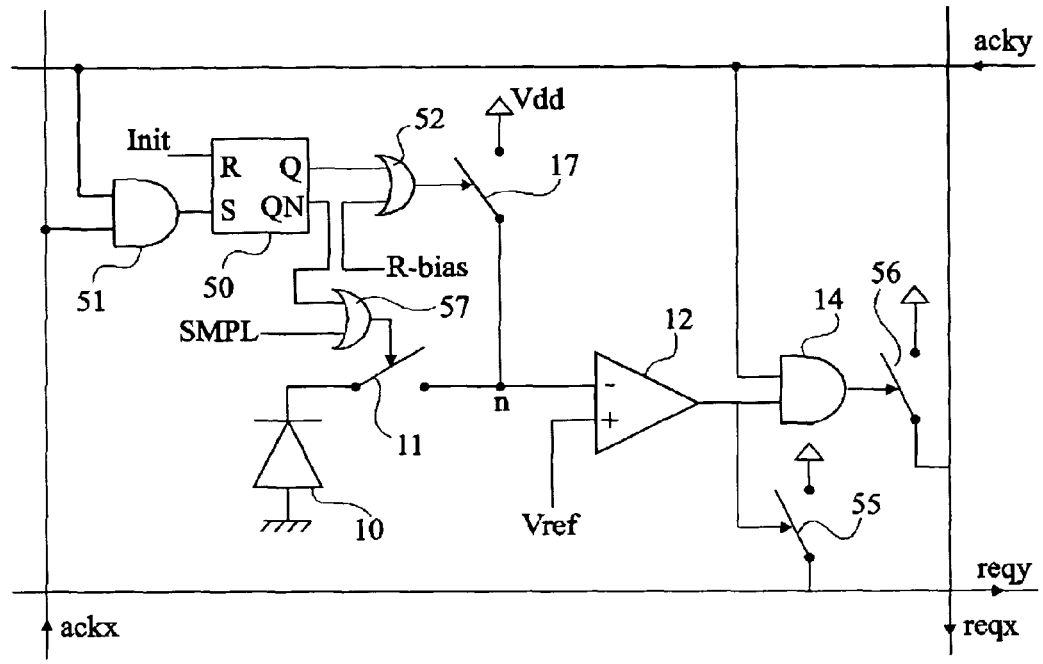
FIGS. 6, 7, 8, and 9 are diagrams of examples of embodiment of the pixel shown in FIG. 2.

In the pixel shown in FIG. 6, locking device 16 is formed by means of an RS flip-flop 50 receiving initialization signal Init on its R reset input and receiving on its S set input the output of an AND gate 51. AND gate 51 receives horizontal and vertical acknowledgment lines ackx and acky. To be able to precharge photodiode 10, switch 17 is controlled by the output of an OR gate receiving on an input a bias signal R-Bias. The Q output of RS flip-flop 50 is connected to the other input of OR gate 52. Further, triggering devices 13 and 15 are in this example switches 55 and 56 placed between supply voltage Vdd and request lines reqy and reqx.

Further, switch 11 is in this example controlled by the output of an OR gate 57 receiving on an input sampling signal SMPL. The other input of OR gate 57 is connected to an input QN of RS flip-flop 50 providing a signal "inverse" to that of the Q output. The presence of OR gate 57 between RS flip-flop 50 and switch 11 avoids that photodiode 10 integrates photons when this is not necessary. Indeed, when the photodiode is relatively lit and the voltage of its cathode decreases to the point that it turns on the photodiode, a parasitic current flows on the ground lines and this creates measurement noise for the neighboring pixels. The OR gate is not required for to the pixel operation, but its presence is however desirable to limit noise problems.

A precharge of photodiode 10 comprises, in this example, the precharging of internal node n to supply voltage Vdd by turning on switch 17 by activation of signal R-Bias, then turning on switch 11 by activation of sampling signal SMPL, to bias the cathode of the photodiode to voltage Vdd.

Further, at the beginning of a detection phase, initialization signal Init is activated and the Q output of RS flip-flop 50 is at 0. Switch 17 can then be turned on only when ordered by signal R-Bias. When the pixel has been detected and acknowledgment lines ackx and acky are activated, the S input of flip-flop 50 and its Q output switch to 1. Switch 17 is on, which "locks" at level "0" the output of comparator 12.

Figure 7:
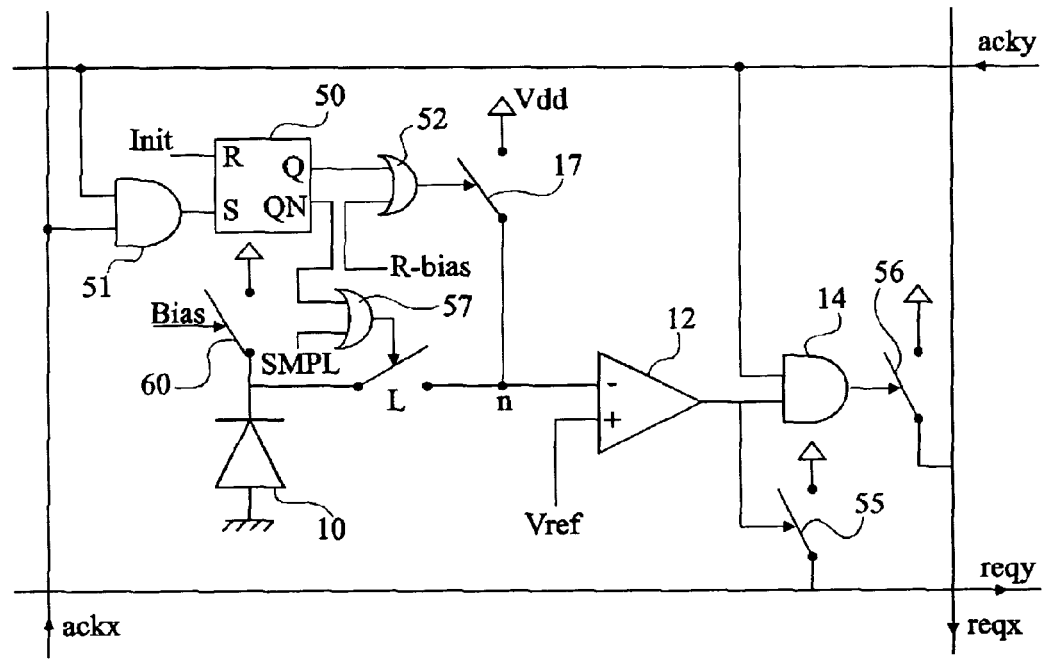

FIG. 7 is a diagram of an alternative embodiment of the pixel shown in FIG. 6. This pixel further comprises a switch 60 controlled by a bias signal Bias and placed between supply voltage Vdd and the cathode of photodiode 10. Switch 60 enables precharging the cathode of photodiode 10 to supply voltage Vdd.

An image sensor comprising pixels such as that shown in FIG. 7 can operate in series or parallel modes described hereafter, conversely to a sensor which comprises pixels such as that shown in FIG. 6. However, whatever the operating mode, a photon integration operation is always followed by a detection operation. In an integration phase, each photodiode is initially pre-charged to voltage Vdd, then integrates the "received" photons. At the end of the integration period, the charges accumulated across each photodiode are transferred onto internal nodes n of the pixels, by activation of sampling signal SMPL. Once switches 11 have been turned back off, an operation of detection of the levels "stored" on internal nodes n is performed.

In the operation in parallel mode, once the charge transfer has been performed and switches 11 have been turned back off, a new integration operation is started in parallel with the operation of detection of the levels stored on internal nodes n. Thus, the integration and detection operations performed for each image capture may be partly parallelized, the operation of detection of a first capture being performed at the same time as the operation of integration of a second capture.

In the series operation, the operations of a second image capture are performed after the operations of a first image capture. The operation of integration of the first capture is started at the end of the operation of detection of the first capture.

The parallel operation enables performing successive image captures with a higher rate.

Figure 8:
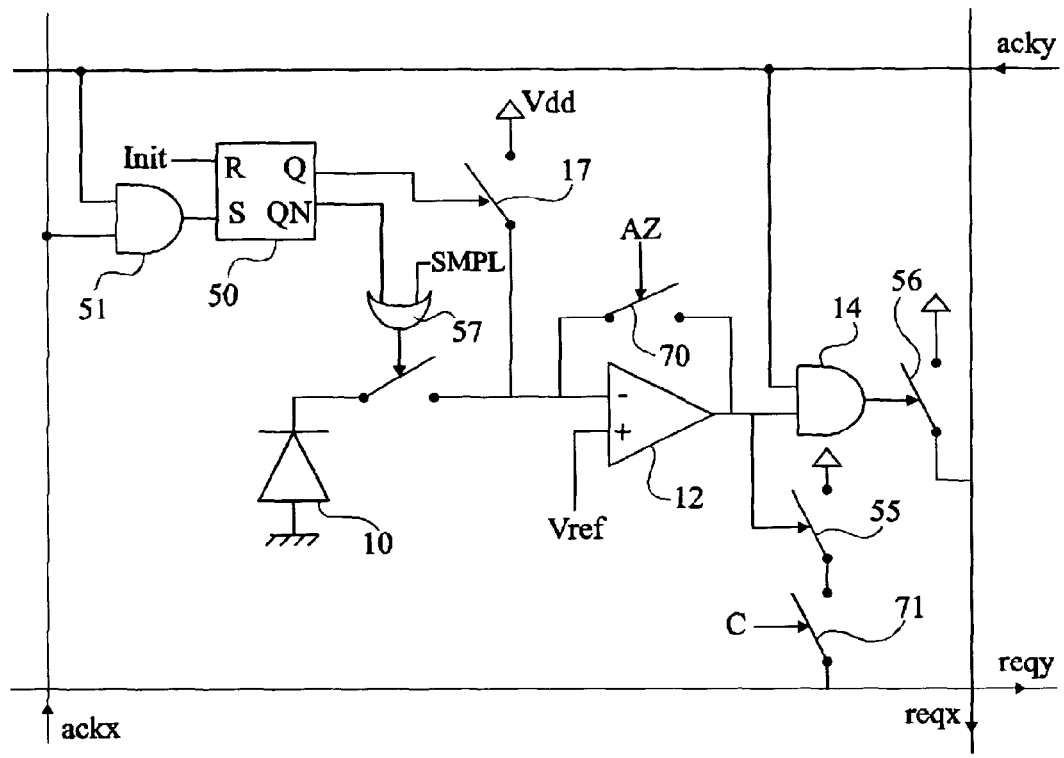

FIG. 8 is a diagram of an alternative embodiment of the pixel shown in FIG. 6, in which OR gate 52 is eliminated, switch 17 being directly controlled by the Q output of RS flip-flop 50. This pixel further comprises a switch 70 placed between the output and the negative terminal of comparator 12. Switch 70 is controlled by an adjustment signal AZ. Further, a switch 71, controlled by a control signal C, is placed between switch 55 and vertical request line reqy. Comparator 12 then is an operational amplifier.

Switch 70 enables performing an "auto-zero" of comparator 12 to overcome a possible comparator offset. In the case where the comparator exhibits as an input a voltage offset ΔV, the comparator switching, in a detection phase, is not performed when reference voltage Vref reaches the value of voltage Vn at node n, but when voltage Vref is slightly greater or smaller than said voltage by ΔV. To avoid errors, it is possible to avoid the offset of comparator 12 by performing an auto-zero of the comparator according to the following method. The reference voltage is set to the value of a pre-charge voltage Vb desired for the internal node n of each pixel. Switch 70 is then turned on, as ordered by adjustment signal AZ, to precharge internal node N to voltage Vb plus or minus offset ΔV of the comparator. Comparator 12 is then equivalent to a follower-assembled amplifier.

This auto-zero process is performed at the beginning of an integration phase to precharge the cathode of the photodiode 10 of each pixel via switch 11. Further, this auto-zero process is performed at the beginning of a detection phase, prior to the charge transfer from photodiode 10 to the node n of each pixel. OR gate 52 and signal R-Bias being eliminated, the auto-zero system is also used as the single means of precharge of the internal node n and of the photodiode 10 of each pixel.

Switch 71 enables disconnecting the pixel from request line reqy during auto-zero operations in which the comparator output voltage is likely to fluctuate and to take a value resulting in turning on switch 55. More generally, switch 71 enables allowing activation of request line reqy only when desired, for example, in pixel detection phases.

Figure 9:
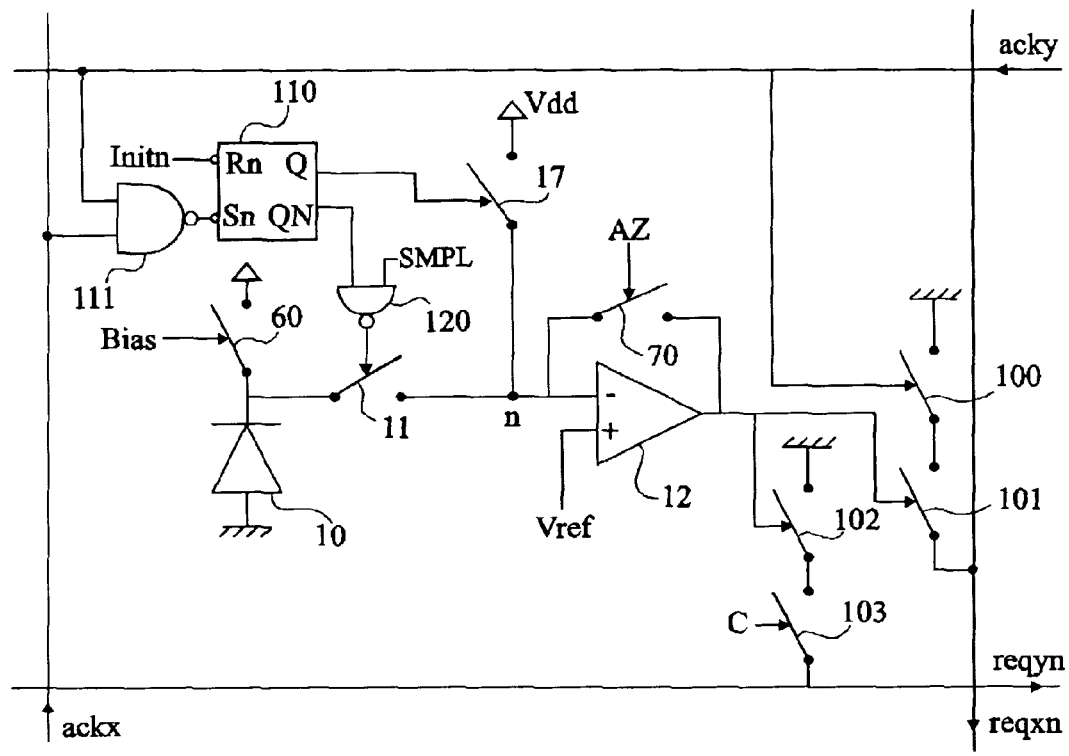

FIG. 9 is a diagram of a pixel formed of logic elements complementary to those of the pixels previously described in relation with FIGS. 6, 7, and 8. Further, request lines reqy and reqx are replaced with inverse request lines reqyn and reqxn which are activated at logic level 0.

As for the previously-described pixels, the pixel comprises a photodiode 10 and a switch 11 placed between photodiode 10 and an internal node n. A comparator 12 receives voltage Vref on a positive terminal reference and voltage Vn at internal node n on a negative terminal. A switch 60, controlled by a bias signal Bias, is placed between supply voltage Vdd and the cathode of photodiode 10. A switch 70, controlled by an adjustment signal AZ, is placed between the output and the negative input of comparator 12. A switch 17 is placed between supply voltage Vdd and internal node n.

The pixel further comprises two switches 100 and 101 placed between the ground and an inverse horizontal request line reqxn. Switch 100 is controlled by vertical acknowledgement line acky and switch 101 is controlled by the output of comparator 12. Two switches 102 and 103 are placed in series between the ground and an inverse vertical request line reqyn. Switch 102 is controlled by the output of comparator 12 and switch 103 is controlled by a control signal C. The pixel further comprises an "inverse" RS flip-flop 110, having its Q output switching to level 0 when inverse reset input Rn is at 0 and switching to level 1 when inverse set input Sn is at 0, inputs Rn and Sn at 1 causing no change at the Q output. The Q output of inverse RS flip-flop 110 controls switch 17. A NAND gate 111 receives as an input a horizontal acknowledgement line ackx and vertical acknowledgement line acky. The output of NAND gate 111 is connected to input Sn of flip-flop 120. An inverse initialization signal Initn is connected to input Rn of flip-flop 110. An inverse input Qn of RS flip-flop 110 is connected to an input of a NAND gate 120. The NAND gate further receives a sampling signal SMPL and controls switch 11.

In this embodiment, switches 100 and 101 are used as an AND-type gate and as triggering devices.

An advantage of the image sensor shown in FIG. 9 is that it comprises logic gates with a low bulk as compared with the other previously-described pixels.

An image sensor comprising pixels such as that shown in FIG. 9 may be used in the same way as the pixels previously described in relation with FIGS. 2, 6, 7, and 8. Only the "active" logic levels of inverse request lines reqyn and reqxn are different from those of request lines reqy and reqx of the previously-described pixels. To take this difference into account, the scan circuits, shown in FIG. 5, must be modified by using complementary logic circuits, which may be easily devised by those skilled in the art. Further, request lines reqyn and reqxn should be connected to deactivation devices to pull the request lines to level "1" outside periods of activation of these lines by a pixel. Such an activation device for example is a resistor placed between a request line and supply voltage Vdd of the image sensor.

Figure 10:
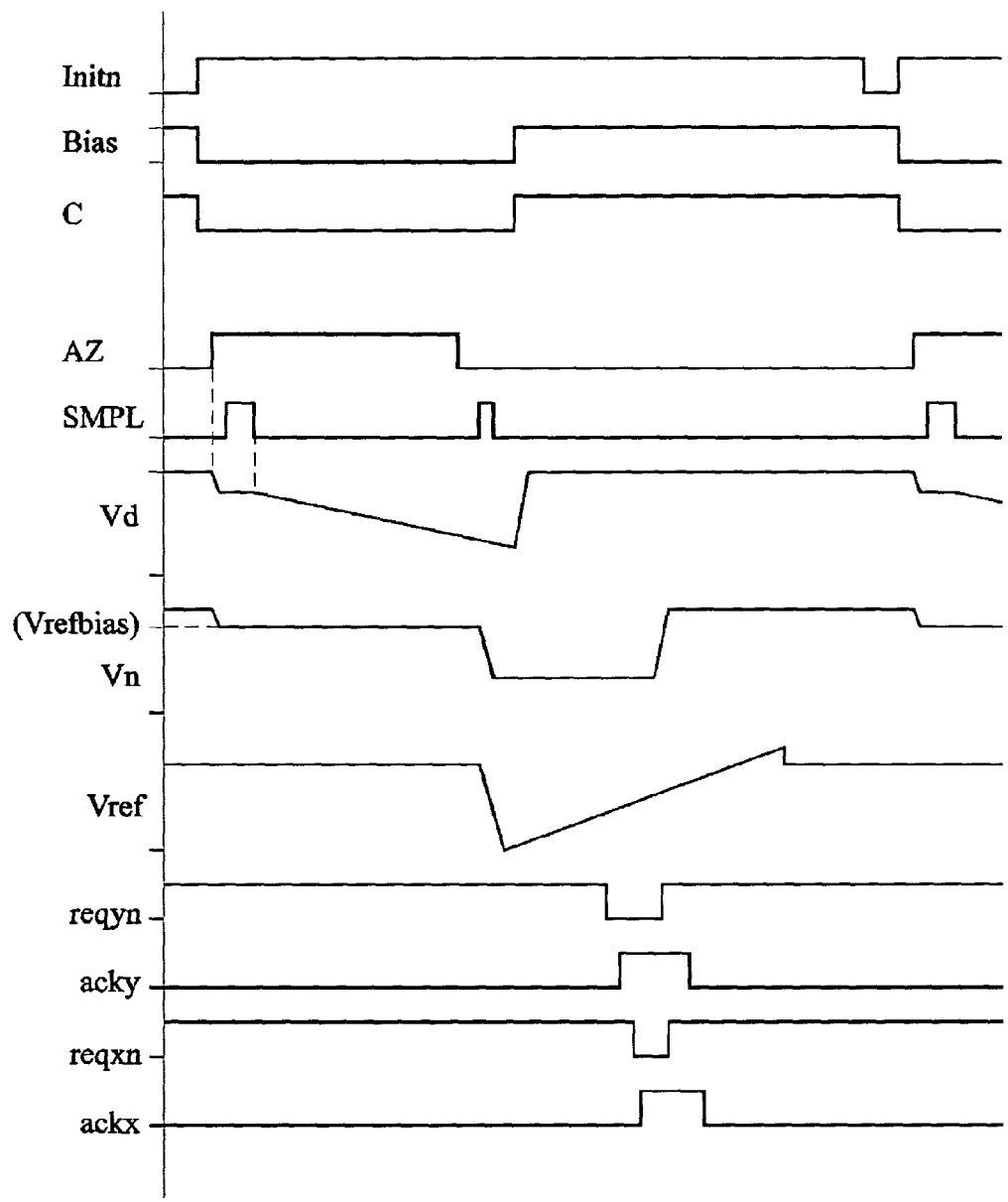
FIG. 10 is a timing diagram illustrating the signals of an image sensor comprising pixels such as that shown in FIG. 9.

FIG. 10 is a timing diagram illustrating the shape of the internal signals and of the signals received by a pixel such as that shown in FIG. 9, in an example of implementation of an image capture. The image capture comprises a photon integration phase and a phase of detection of each pixel.

Inverse initialization signal Initn is activated, to logic level 0 between each image capture, to unlock the output of comparator 12 at the end of a detection phase. Bias signal Bias is activated outside photon integration phases. Control signal C is activated during detection phases.

At the beginning of the image capture, voltage Vn at node n is substantially equal to voltage Vdd. An auto-zero of comparator 12 is then performed by activating adjustment signal AZ to "1". During this auto-zero, switch 11 is turned on by activation to "1" of sampling signal SMPL. Voltage Vn at node n and voltage Vd across the photodiode are then equal, neglecting the offset of comparator 12, to a precharge reference voltage Vref-bias, close to voltage Vdd in this example. Sampling signal AZ is deactivated and the photon integration phase is started. Voltage Vd progressively decreases. At the end of the integration phase, a charge transfer from the photodiode to node n is performed by activating sampling signal SMPL. Voltage Vn is then equal to voltage Vd. The reference voltage switches from value Vref-bias to zero, after which the detection phase starts. Voltage Vref follows a stepped ramp, such as that previously described in relation with FIG. 4. When voltage Vref is equal to voltage Vn, signals reqy, acky, reqx, ackx are successively activated by the pixel or the scan circuits of the image sensor. Once the pixel has been detected, the Q output of flip-flop 110 switches to 1 and node n rises back to voltage Vdd. The output of comparator 12 locks. Signals reqy and reqx are in this example simultaneously deactivated, the pixel being for example the only one in the row to have manifested on the considered stage of voltage Vref. Acknowledgement signals acky and ackx are then deactivated by the vertical and horizontal scan circuits of the sensor.

It should be noted that signals Bias and C are identical in the example shown in FIG. 10 where the image captures are performed in series. A single signal could then be used to control switches 103 and 60. The dissociation of signals Bias and C is necessary only in the case where image captures in parallel mode are desired to be performed.

The various previously-described variations of the pixel shown in FIG. 2 are pixels capable of manifesting when the sampled intensity variation, that is, voltage Vn at node n, is smaller than a reference voltage. The detection of all the array pixels must then performed by starting with the most strongly-lit pixels and said pixels must be locked so that they do not manifest at each stage of the reference voltage.

Other types of pixels may be used in an image sensor according to the present invention. The positive and negative terminals of the comparator of the pixel shown in FIG. 2 may for example be inverted. In this case, the pixel is capable of manifesting when the sampled intensity value, voltage Vn, is greater than a reference voltage. The used reference voltage then is a descending voltage ramp. Further, the pixel detection is performed by starting with the less strongly lit and said pixels are locked once detected.

Another example of a pixel that may be used in an image sensor according to the present invention is a variation of the pixel shown in FIG. 2, comprising a second comparator. The positive terminal of the second comparator is connected to a second reference voltage Vref2 and the negative terminal is connected to node n. An XOR gate receives the outputs of the two comparators. The first and second reference voltages are slightly offset with respect to each other, voltage Vref2 being for example greater than the reference voltage by one millivolt. These two comparators enable surrounding the voltage at node n, in other words the output of the XOR gate is at level 1 only when voltage Vn at node n is comprised between voltages Vref1 and Vref2. Such a pixel then manifests only when the sampled intensity value, voltage Vn, is equal to the voltage, or more specifically to the minirange of voltages delimited by reference voltages Vref1 and Vref2. The locking device is then useless.

It should further be noted that in the examples of pixels shown in FIGS. 7 and 9, OR gate 57 and NAND gate 120 are optional since the presence of switch 60 enables maintaining the cathode of photodiode 10 at a positive voltage, and thus avoiding that the photodiode turn on and generate measurement noise. OR gate 57 and NAND gate 120 are useful when the image sensor is used to perform measurements of light intensities over a wide range of light intensity values according to the method described hereafter.

1.5 Applications

An image sensor according to the present invention may be used in various applications.

A first application is the detection of light spots or, conversely, of dark spots. This may, for example, be used in a car to detect the headlights of other cars. The capture of an image in this case comprises identifying all the image sensor pixels receiving a strong light intensity value. By performing successive image captures, it is possible to know whether a car comes closer or moves away by analyzing the diameter variations of the very brightly lit areas corresponding to headlights.

In this first application, reference voltage Vref is set to a set value during a detection phase. No voltage ramp is then followed. In the case where the array comprises pixels such as that illustrated in FIG. 2, for which the reference voltage is connected to the positive terminal of the comparator of each pixel, it is possible to detect the most brightly lit pixels, that is, those for which, in a detection phase, voltage Vn at node n is smaller than the value selected for the reference voltage. Conversely, since the array comprises pixels for which the reference voltage is connected to the negative terminal of the comparator of each pixel, it is possible to detect the less brightly lit pixels. In the case where the array comprises pixels with two comparators, it is possible to detect the pixels exhibiting a given light intensity value which is a function of the selected reference voltage.

A second application is the creation of video sequences. The capture of an image comprises, in this case, a detection phase formed of several detection cycles enabling successive detection of the pixel groups receiving different light intensity values. Further, in the detection phase, a digital value Pixval is assigned to all the array pixels. The reference voltage used for the pixel detection must then scan all the possible voltage values that can be sampled from node n of a pixel such as those described previously. To provide a standard video signal formed of a succession of frames, "restoring" means must be associated with the image sensor according to the present invention. Such restoring means are for example formed of a buffer memory and of a signal generation device. The buffer memory is used to temporarily save the address/digital value couples provided by the image sensor in a detection phase. The signal generation device then provides a succession of frames, each frame indicating the light intensity values of the pixels of a row of the pixel array of the image sensor.

Whatever the envisaged application, it should be noted that the detection of a pixel receiving a given light intensity value may be performed within a very short time, such as some ten nanoseconds. For a standard sensor comprising an array of 480-640 pixels, a few milliseconds only are necessary to scan all the sensor pixels. The phase of a detection of an image capture being very short for such standard image sensor sizes, successive image captures may be performed with a high frequency.

Further, the detection phases being very short, the voltages stored on internal nodes n of the pixels such as described previously do not deteriorate and the light intensity values assigned to the pixels are correct.

Other applications may be devised by those skilled in the art. Another example of application is described hereafter.

2. Method For Capturing Images With a "Wide Dynamic Range"

2.1 General Considerations

An image sensor according to the present invention enables measuring, for each pixel, a very wide range of light intensity values according to a so-called "wide dynamic range" image capture method.

Figure 11:
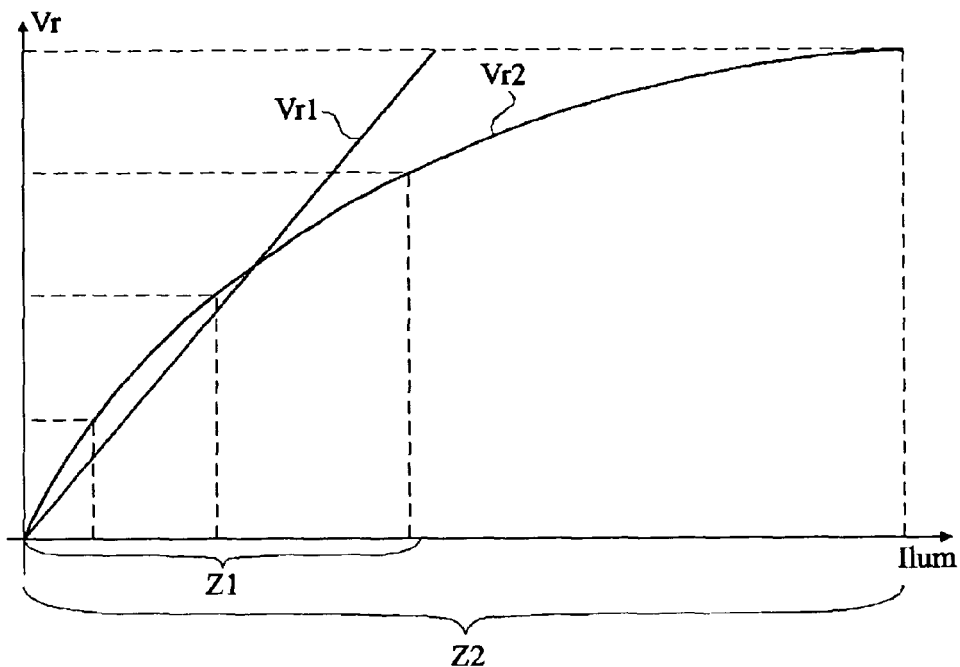
FIG. 11 is a diagram illustrating the shapes of response signals of various image sensors according to the light intensity received by these sensors.

FIG. 11 is a diagram illustrating the shapes of response signals of two image sensors according to the light intensity received by these sensors. The first sensor provides a response signal Vr1 proportional to the received light intensity and the second sensor provides a substantially logarithmic response signal Vr2 which corresponds to a human eye response. The first sensor enables measuring light intensities within a relatively narrow range of values z1 while the second sensor enables measuring light intensities within a very wide range of light intensity values z2.

"Elementary" image sensors provide response signals of type Vr1. Said signals do not enable measuring high light intensity values. This is due, on the one hand, to the fact that the amplitude of the voltage variations across the photodiode is relatively low, the voltage typically ranging between 0 and 1 or 2V, and on the other hand to the fact that the detection means do not generally provide a measurement accuracy better than one mV.

An example of an image sensor enabling measuring a Vr2-type response signal comprises pixels, each comprising an assembly of capacitors in parallel on their photodiode, where each capacitor can or not be connected to the photodiode by a switch. In a photon integration phase, an increasing number of capacitors are connected on the photodiode. The more the voltage across the photodiode decreases, the higher the number of connected capacitors.

The pixels of such a sensor are very complex and the use of the capacitors is delicate. Further, the provided response signal is very discontinuous.

2.2 Method Description

Figure 12:
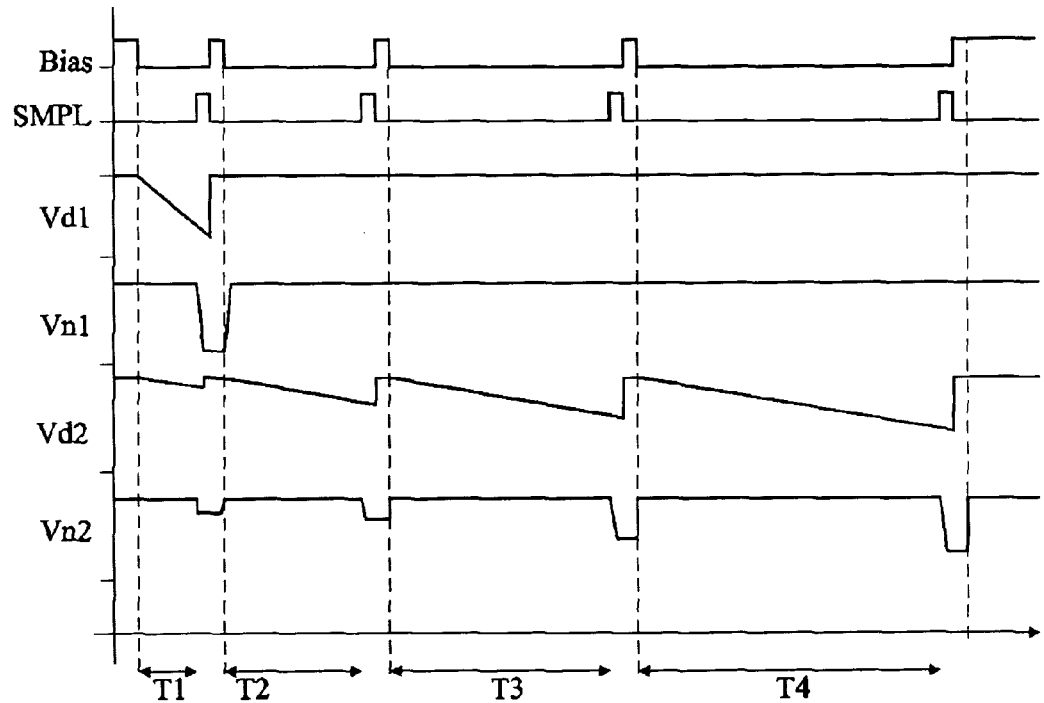
FIG. 12 is a timing diagram illustrating the operation of an image sensor according to the present invention when performing light intensity measurements over a wide range of light intensity values.

FIG. 12 illustrates an example of implementation of the wide dynamic range image capture method according to the present invention for an image sensor comprising pixels such as that shown in FIG. 7. In an image capture, several integration phases of different durations are performed, in this example, four integration phases of increasing durations T1 to T4. Each integration phase ends with an activation of sampling signal SMPL and is followed by a detection phase, not illustrated. The photodiodes of the sensor pixels are precharged, by activation of bias signal Bias, prior to each integration phase.

In the first detection phase following the first integration phase with the shortest duration T1, a first group of the most brightly lit pixels is detected, the other pixels not being detected. In the second detection phase, following the second integration phase with a slightly longer duration T2, a second group of a little less brightly lit pixels is detected, and so on until the fourth detection phase, following the fourth integration phase with the longest duration T4, during which a fourth group of the less brightly lit pixels is detected.

Voltages Vd1 and Vd2 across first and second photodiodes of the sensor are illustrated in FIG. 12. The first photodiode is that of a very brightly lit pixel receiving a large number of photons. The second photodiode is that of a "dark" pixel comparatively receiving a very small number of photons. Voltage Vd1 has strongly decreased at the end of the first integration phase, conversely to voltage Vd2. The first pixel is detected at the first detection phase, after which it is locked, voltages Vd1 and Vn1 remaining unchanged during the next integration and detection phases of the capture. The second pixel is not detected at the first, second, and third detection phases, and remains "free", that is, unlocked. Only at the last detection phase is the second pixel detected.

At each detection phase, reference voltage Vref scans a predefined range of values. This voltage range corresponds to a range of predefined light intensity values. With the i-th detection phase is thus associated a range Pi of light intensity values. The concatenation, in other words, the gathering, of all the ranges of light intensity values, provides a very wide range of light intensity values. Examples of ranges of values are given hereafter.

Further, at each detection, a signal value is assigned to each pixel. The signal value of each pixel is defined by a number formed of n bits, n1 most significant bits, and n2 least significant bits. Number n1 is selected so that the number of integration periods is equal to $2^{n1}$. The pixels of a same group, detected in a same detection phase, are assigned a same value for the n1 most significant bits, the assigned value being greater as the pixels receive more light energy. In the example illustrated in FIG. 12, the first group of pixels is assigned value 11 and the last group of pixels is assigned value 00. The value of the n2 least significant bits of a pixel is then assigned according to the voltage value sampled at the i-th detection phase during which it is detected. If the sampled voltage value corresponds to a low light intensity value for the range of light intensity values Pi associated with the i-th detection phase, the value of the n2 bits is low, and conversely.

The definition of the light intensity values and the assigning of a digital value to each pixel will be better understood with the two following examples of embodiment of the method according to the present invention.

In a first example, four consecutive integration phases of increasing durations T1 to T4 and respectively equal to 30 µs, 300 µs, 3 ms, and 30 ms, are used for each image capture. In the first three detection phases, reference voltage Vref switches from 0 V to 0.9*Vb, where Vb is the precharge voltage of the pixels. In the fourth and last detection phase, reference voltage Vref switches from 0 V to Vb. The signal value of each pixel is defined by a 10-digit number, comprised of 2 most significant bits and 8 least significant bits.

The following table summarizes the features of this method example. For each integration period, what the voltage difference ΔV measured across the photodiode after the maximum integration duration, T4 in this example, is or would be if the voltage of the cathode of the photodiode could indefinitely decrease is defined. The maximum difference ΔV would be reached by the most brightly lit pixels. The digital signal value assigned to a pixel when it is detected after an integration period is also defined. Only the minimum and maximum digital values that can be assigned to the pixels of a given group are indicated.

| Integration period | Equivalent ΔV | Vref ramp | Most significant bits | Least significant bits | Corresponding decimal value |
|---|---|---|---|---|---|
| T4 = | 0 | 0 | 00 | 00000000 | 0 |
| 30 ms | Vb | 0.9 * Vb | 00 | 11111111 | 255 |
| T3 = 3 ms | Vb | 0 | 01 | 00000000 | 256 |
|  | 10 Vb | 0.9 * Vb | 01 | 11111111 | 511 |
| T2 = | 10 Vb | 0 | 10 | 00000000 | 512 |
| 300 µs | 100 Vb | 0.9 * Vb | 10 | 11111111 | 767 |
| T1 = | 100 Vb | 0 | 11 | 00000000 | 768 |
| 30 µs | 1000 Vb | Vb | 11 | 11111111 | 1023 |

It should be noted that the method of the present invention enables artificially increasing the amplitude of the voltage variations across the photodiode. Considering that it is possible to measure voltages in the pixel to within one millivolt, the above-mentioned method enables measuring equivalent voltage differences ΔV extending from 1 mV to 1000*Vb. A general range of light intensity values exhibiting a difference of more than 100 dB between its minimum and maximum values is thus obtained.

In a second example, 8 consecutive integration phases of increasing durations T1 to T8, T7 being equal to T8/4, T6 equal to T7/4, and so on are used. The signal value of each pixel is defined by a 10-digit number, comprised of 3 most significant bits and 7 least significant bits. In each detection phase, a voltage ramp is followed between minimum and maximum values spaced apart from each other by 127 mV, the reference value increasing by 1-mV stages. The minimum and maximum values are specific to each detection phase, an example of values being given in the following summary table. This table summarizes the features of the second method example according to a format similar to the previous table.

| Integration period | Equivalent ΔV | Vref ramp | Most significant bits | Least significant bits | Corresponding decimal value |
|---|---|---|---|---|---|
| T8 | 0 | 0 | 000 | 0000000 | 0 |
|    | 127 mV | 127 mV | 000 | 1111111 | 127 |
| T7 | 128 mV | 32 | 001 | 0000000 | 128 |
|    | 639 mV | 159 | 001 | 1111111 | 255 |
| T6 | 640 mV | 40 | 010 | 0000000 | 256 |
|    | 2.679 V | 167 | 010 | 1111111 | 383 |
| T5 | 2.688 V | 42 | 011 | 0000000 | 384 |
|    | 10.879 V | 169 | 011 | 1111111 | 511 |
| T4 | 10.880 V | 42.5 | 100 | 0000000 | 512 |
|    | 43.519 V | 169.5 | 100 | 1111111 | 639 |
| T3 | 43.520 V | 42.5 | 101 | 0000000 | 640 |
|    | 174.079 V | 169.5 | 101 | 1111111 | 767 |
| T2 | 174.080 V | 42.5 | 110 | 0000000 | 768 |
|    | 694.272 V | 169.5 | 110 | 1111111 | 895 |
| T1 | 969.320 V | 42.5 | 111 | 0000000 | 896 |
|    | 2777.088 V | 169.5 | 111 | 1111111 | 1023 |

It should be noted that, whatever the used method, the sum of the integration periods must be smaller than 33 or 40 ms to be able to perform image captures with a 30- or 25-Hz video frequency according to standards. More specifically, the total integration duration plus the detection time necessary to detect all the array pixels must be smaller than or equal to 33 or 44 ms. The total duration of all the detection phases of an array of standard 80*640 size being of a few milliseconds for an image sensor according to the present invention, the total integration time can be relatively long. This enables performing very accurate light intensity measurements.

Further, in the previously-described examples, the integration periods are of increasing durations and the most brightly lit pixels are detected first. This operating mode corresponds to that which can be implemented with a sensor comprising pixels such as described in relation with FIG. 2, in which the pixel manifests when voltage Vn is smaller than a reference voltage, the reference voltage having the shape of an ascending ramp in detection phases. The most brightly lit pixels must indeed be detected first and locked since they would otherwise manifest in all detection phases.

In the case where the image sensor comprises pixels capable of manifesting when the sampled intensity value is greater than a reference voltage, having the shape of a descending ramp in detection phases, the integration periods are of decreasing durations, the less brightly lit pixels being detected first and locked.

In the case where the used image sensor comprises pixels capable of manifesting only when their sampled intensity value is equal to a reference value, the order of the different integration periods is of no importance.

Further, the detection phases following each of the integration phases may be performed totally or partially in parallel mode. Thus, the detection phase following the first integration phase may be performed in parallel with the second integration phase and so on. This operation mode can however be envisaged only for small pixel arrays for which it is possible to possibly scan all the array pixels for a very short time corresponding to the shortest integration period. In the case of bigger pixel arrays, it is possible to parallellize the detection and integration phases only for the longest integration periods.

Further, instead of having several consecutive charge storage phases between which the pixels are "reset" by precharging of their photodiode, a single charge storage phase may be provided. In this case, voltage Vd across the photodiode of each pixel is stored on its node n several times after each of the considered integration time periods from the beginning of the charge storage phase. The internal nodes are then not precharged between each charge transfer. A detection phase is performed after each charge transfer. For the same reasons as those mentioned previously, this method can only be envisaged for small pixel arrays.

3. Masking of the Sensor

The architecture of an image sensor comprising pixels such as shown in FIG. 2 and horizontal and vertical scan circuits such as those shown in FIG. 5 enables performing a "masking" of the image sensor pixels to make a set of pixels inoperative by locking their locking circuit 16. Thus, in an image capture, only the unlocked pixels manifest. An example of a masking device is described hereafter.

Figure 13:
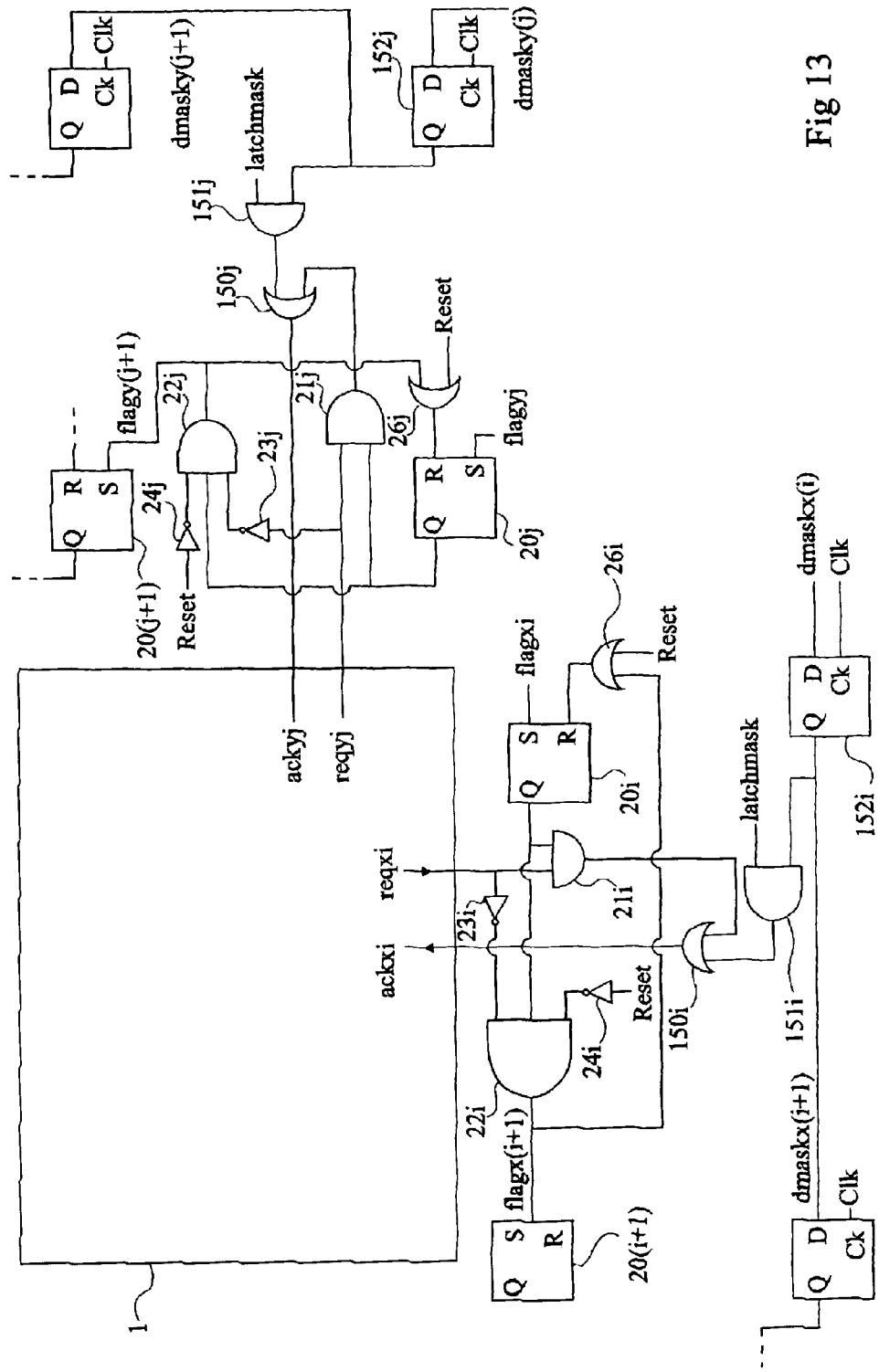
FIG. 13 is a diagram of a masking device associated with scan circuits of an image sensor such as that illustrated in FIGS. 1, 2, and 5.

FIG. 13 is a diagram illustrating a masking device associated with vertical and horizontal scan circuits 2 and 3. The vertical scan circuit is formed of elementary blocks identical to those shown in FIG. 5, except that the output of OR gate 21j is not directly connected to vertical acknowledgment line acky. Similarly, the horizontal scan circuit is formed of elementary blocks identical to those of the vertical scan circuit. The i-th elementary block of the horizontal scan circuit comprises an RS flip-flop 20i receiving a flag signal flagxi on its S set input. The Q output of RS flip-flop 20i is connected to an AND gate 21i and to an AND gate 22i. AND gate 21i receives on another input a request line reqxi. An inverter 23i is placed between request line reqx and an input of AND gate 22i. Further, an input of AND gate 22i is connected to the output of an inverter 24i receiving a signal Reset. The output of AND gate 22i is connected to an input of an OR gate 26i which further receives signal Reset. The output of OR gate 26i is connected to the R reset input of RS flip-flop 20i. AND gate 22i provides a flag signal flagx(i+1) to the input of a flip-flop 20(i+1) of the next elementary block.

The masking device is in this example formed of elementary blocks associated with each of the elementary blocks of vertical and horizontal scan circuits 2 and 3. The j-th "vertical" elementary block of the masking device, associated with the j-th elementary block of vertical scan circuit 2 comprises an OR gate 150j, an AND gate 151j, and a flip-flop 152j having its Q output taking the value set on its data input D on a rising edge of a clock signal Clk applied on its input Ck. Similarly, the i-th horizontal elementary block of the masking device, associated with the i-th elementary block of vertical scan circuit 2, comprises an OR gate 150*i*, an AND gate 151*i*, and a flip-flop 152*i*. AND gates 21*j* and 21*i* of the j-th and i-th elementary blocks of vertical and horizontal scan circuits 2 and 3 are respectively connected to an input of OR gates 150*j* and 150*i*. The outputs of OR gates 150*j* and 150*i* are respectively connected to vertical and horizontal acknowledgment lines reqyj and reqxi. The output of each AND gate 151*j* and 151*i* is respectively connected to an input of gates 150*j* and 150*i*. The Q output of each flip-flop 152*j* and 152*i* is respectively connected to an input of AND gates 151*j* and 151*i*. AND gates 151*j* and 151*i* each receive a masking memorization signal latchmask. Flip-flop 152*j* receives on its D input a masking data signal dmaskyj. Signal smasky1 provided to flip-flop 152(*y*=1) of the first "vertical" elementary block of the masking device originates from control circuit 6 of the image sensor. For the other blocks, signal dmaskyj received by flip-flop 152*j* of the j-th block originates from the Q output of flip-flop 152(*j*−1) of the (j−1)-th block. Similarly, flip-flop 152*i* receives on its D input a masking data signal dmaskxi. Signal dmaskx1 provided to flip-flop 152(*x*=1) of the first "horizontal" elementary block of the masking device originates from control circuit 6 of the image sensor. For the other blocks, signal dmaskxi received by flip-flop 152*i* of the i-th block originates from the Q output of flip-flop 152(*i*−1) of the (i−1)-th block.

The operation of the masking device is the following. To make a pixel located on a j-th row and on an i-th column inoperative, acknowledgment lines ackyj and ackxi must be activated. In the case, for example, where the set of pixels located in a lower right quadrant of the pixel array is desired to be made inoperative, the first N/2 vertical acknowledgment lines reqy1 to reqy(N/2) must be activated and the first M/2 horizontal acknowledgment lines reqx1 to reqx(M/2) must be activated. For this purpose, the Q outputs of flip-flops 152(*j*=1 to N/2) and of flip-flops 152(*i*=1 to M/2) are set to "1" and the outputs of the other flip-flops 152(*j*=(N/2) to N) and of flip-flops 152(*i*=(M/2) to M) are set to "0". To achieve the above-mentioned setting, control circuit 6 provides in series a sequence of "0"s, then a sequence of "1"s on signal smasky1 and on signal dmaskx1. The provided values are offset from one flip-flop to another at the rate of clock signal Clk. When the first values provided by control circuit 6 reach the level of the last flip-flops 152(*j*=N) and 152(*i*=M), the values stop offsetting. Signal latchmask is then activated, by being switched to level "1" in this example. The acknowledgment lines acky and ackx connected to flip-flops 152 exhibiting an output at level "1" are then activated. The pixels of the lower right quadrant lock. Signal latchmask is then deactivated. An image capture can then be performed. In this capture, only the pixels located in the other quadrants of the array are likely to manifest.

In the case where scattered pixels rather than an entire array pixel "area" are desired to be made inoperative, it may be necessary to lock the pixels row after row or column after column.

Other masking devices may be devised by those skilled in the art. Flip-flops 152 may for example be arranged in parallel and not in series. Further, in the case where the flip-flops are placed in series, it is possible to form a single chain of flip-flops gathering the vertical and horizontal chains shown in FIG. 13.

Of course, the present invention is likely to have various alterations, modifications, and improvements which will readily occur to those skilled in the art. In particular, other structures of image sensors according to the present invention may be devised.

Further, the pixels of an image sensor according to the present invention may comprise other types of photodetectors such as PhotoMOSes or pinned diodes.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An image sensor comprising an assembly of pixels, coding means providing an address for each of said pixels and a generator of a reference voltage having, in pixel detection operations, the shape of a staged voltage ramp, each pixel comprising:
    a photodetector;
    a switch controllable by a sampling signal and placed between the photodetector and an internal node;
    a comparator operable to compare a voltage of the internal node and the reference voltage;
    a first triggering device capable of activating a vertical request line when the comparator output is at a first predefined "0" or "1" logic level;
    an AND-type gate receiving the vertical request line and a vertical acknowledgement line;
    a second triggering device capable of activating a horizontal request line when the output of the AND-type gate is active; and
    a locking device forcing the output of the comparator to a second predefined level, different from the first predefined level, when the vertical request line and a horizontal acknowledgement line are activated, the locking device further receives an initialization signal enabling unlocking the comparator output.

2. The image sensor of claim 1, wherein in an image capture, the detection means are controlled to successively detect pixel groups, the pixels of a same group receiving substantially identical light intensities.

3. The image sensor of claim 1, wherein the pixels form a pixel array arranged in rows and columns, the pixels of a same row being connected to a vertical request line and a vertical acknowledgement line, and the pixels of a same column being connected to a horizontal request line and a horizontal acknowledgement line, a vertical scan circuit being connected to the vertical request and acknowledgement lines and a horizontal scan circuit being connected to the horizontal request and acknowledgement lines, where the request lines can be activated by the pixels and the acknowledgement lines can be activated by the scan circuits after detection of activated request lines.

4. The image sensor of claim 3, wherein the vertical scan circuit comprises means for, at each stage of the reference voltage, detecting one by one the activated rows which have the vertical request line activated by one or several pixels of the considered row, and means for activating the vertical acknowledgement line of each activated row, and wherein the horizontal scan circuit comprises means for, at each activated row, detecting one by one the activated columns which have the horizontal request line activated by a pixel of the considered column, and means for activating the horizontal acknowledgement line of each activated column.

5. The image sensor of claim 3, wherein said coding means comprise first and second coding circuits respectively connected to the vertical and horizontal scan circuits, the first coding circuit providing a first address corresponding to a row number and the second coding circuit providing a second address corresponding to a column number, the gathering of the first and second addresses forming said address associated with each pixel.

6. The image sensor of claim 1, wherein said generator is a digital-to-analog converter controlled by a counter, the voltage ramp provided by the generator on detection operations being performed in stages each corresponding to an increment or a decrement of the counter, a conversion device connected to the counter providing digital values corresponding to a light intensity level.

7. The image sensor of claim 1, further comprising a masking device capable of controlling the pixel locking devices to deactivate the controllable devices of a set of pixels.

8. A method of capture of an image by an image sensor comprising an array of pixels arranged in rows and columns, each pixel comprising a photodetector, the method comprising:
   integrating in each photodetector the photons received by each pixel, for a predefined integration time period;
   detecting the pixels receiving a given light intensity value;
   providing, for each of said pixels, an address indicating the row and the column to which the considered pixel belongs;
   generating a reference voltage having the shape of a staged voltage ramp;
   controlling, by a sampling signal, a switch coupled between the photodetector and an internal node;
   comparing, by a comparator, a voltage of the internal node and the reference voltage;
   activating a vertical request line when the comparator output is at a first predefined logic level;
   activating a horizontal request line when the vertical request line and a vertical acknowledgement line are active; and
   forcing the output of the comparator to a second predefined logic level when the vertical request line and a horizontal acknowledgement line are activated.

9. The image capture method of claim 8, wherein detecting and providing an address are repeated for different light intensity values ranging within a predefined range of light intensity values.

10. The image capture method of claim 8, comprising repeating, n times the method for different integration time periods T1 to Tn, a range of light intensity values Pi detected in the i-th repetition corresponding to values which are higher as the integration time period Ti is shorter, i ranging between 1 and n.

11. The image capture method of claim 10, wherein photons are integrated for successive integration time periods T1 to Tn, and the photodetectors are reset prior to each integration phase.

12. The image capture method of claim 10, wherein time periods T1 to Tn are increasingly long, and ranges P1 to Pn correspond to ranges of decreasing values.

13. The method of claim 10, wherein with each of said pixels detected as having a given light intensity value is associated a digital value corresponding to the light intensity value received by the considered pixel, each digital value being coded over n bits distributed in n1 most significant bits and n2 least significant bits, number k of repetitions of the detection operations being equal to $2n^1$, and wherein the values of the n1 most significant bits of the pixel groups detected in the n repetitions are different, the value of the n1 most significant bits of a pixel group being all the higher as the range of light intensity values associated with this group is high, the n2 least significant bits of the digital values of a pixel having a value which is all the higher as the light intensity level received by this pixel corresponds to a high level of the range of light intensity values associated with the group of this pixel.

14. A method of operating the image sensor of claim 6, the method comprising:
   activating the sampling signal to perform a charge transfer from the photodiode to the internal node of each pixel, then deactivating the sampling signal;
   controlling the staged ramp on the reference voltage and, for each stage, detecting a group of pixels by:
   a) detecting the activation of the vertical request line of a first activated row and activating the vertical acknowledgement line of this first activated row;
   b) providing a first address corresponding to the first activated row;
   c) detecting the activation of the horizontal request line (reqx) of a first activated column and activating the horizontal acknowledgement line (ackx) of this first activated column;
   d) providing a second address corresponding to the first activated column, and providing a general address resuming the first and second addresses;
   e) detecting, if present, a second activated column and activating its horizontal acknowledgement signal;
   f) providing a second address corresponding to the second activated column, and providing a general address;
   g) repeating, if need be, operations e) and f) for other activated columns; and
   h) performing, if need be, a new detection of a second activated row and resuming operations b) to g) for this second activated row, and so on until the last activated row.

* * * * *

UNITED STATES PATENT AND TRADEMARK OFFICE
CERTIFICATE OF CORRECTION

| | | |
|---|---|---|
| PATENT NO. | : 7,821,558 B2 | Page 1 of 1 |
| APPLICATION NO. | : 11/599176 | |
| DATED | : October 26, 2010 | |
| INVENTOR(S) | : Josep Segura Puchades | |

It is certified that error appears in the above-identified patent and that said Letters Patent is hereby corrected as shown below:

Col. 17, Line 29, should read:
array of standard 480*640 size being of a few milliseconds for Signed and Sealed this
Twenty-fifth Day of January, 2011

David J. Kappos
*Director of the United States Patent and Trademark Office*